(12) United States Patent
Lee et al.

(10) Patent No.: US 10,640,207 B2
(45) Date of Patent: May 5, 2020

(54) TILT-PROP AIRCRAFT

(71) Applicant: KOREA AEROSPACE RESEARCH INSTITUTE, Daejeon (KR)

(72) Inventors: Myeong Kyu Lee, Daejeon (KR); Seong Wook Choi, Daejeon (KR); Deog-Kwan Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 295 days.

(21) Appl. No.: 15/820,787

(22) Filed: Nov. 22, 2017

(65) Prior Publication Data

US 2018/0155019 A1    Jun. 7, 2018

(30) Foreign Application Priority Data

Nov. 28, 2016   (KR) .................. 10-2016-0159422

(51) Int. Cl.
| | |
|---|---|
| *B64C 29/00* | (2006.01) |
| *B64D 35/04* | (2006.01) |
| *B64C 27/59* | (2006.01) |
| *B64C 27/46* | (2006.01) |
| *B64C 27/28* | (2006.01) |

(52) U.S. Cl.
CPC .......... *B64C 29/0033* (2013.01); *B64C 27/59* (2013.01); *B64D 35/04* (2013.01); *B64C 27/28* (2013.01); *B64C 27/46* (2013.01); *Y02T 50/44* (2013.01)

(58) Field of Classification Search
CPC ......... B64C 27/28; B64C 27/46; B64C 27/59; B64C 29/0033; B64D 35/04; Y02T 50/44

USPC .......................................................... 244/7 A
See application file for complete search history.

(56) References Cited

U.S. PATENT DOCUMENTS

| | | | | | |
|---|---|---|---|---|---|
| 2,437,330 | A | * | 3/1948 | Mullgardt | B64C 29/0033 244/48 |
| 4,979,698 | A | * | 12/1990 | Lederman | B64C 29/0033 244/17.13 |
| 5,839,691 | A | * | 11/1998 | Lariviere | B64C 27/605 244/7 R |
| 2003/0183722 | A1 | * | 10/2003 | Zoppitelli | B64C 27/28 244/7 A |
| 2009/0256026 | A1 | * | 10/2009 | Karem | B64C 27/08 244/99.2 |
| 2010/0072325 | A1 | * | 3/2010 | Sambell | B64C 11/28 244/7 A |

(Continued)

FOREIGN PATENT DOCUMENTS

| | | |
|---|---|---|
| KR | 10-2009-0067686 A | 6/2009 |
| KR | 10-2017-0135577 A | 12/2017 |

*Primary Examiner* — Claude J Brown
(74) *Attorney, Agent, or Firm* — Buchanan Ingersoll & Rooney PC

(57) ABSTRACT

A tilt-prop aircraft is configured to operate in a vertical take-off and landing (VTOL) mode or a forward flight mode by adjusting a tilt angle of a rotor connected to a wing. The tilt-prop aircraft includes: a blade included in the rotor and configured to rotate to produce lift and thrust; and a tilt center shaft configured to connect the rotor and the wing to each other and adjust the tilt angle of the rotor with respect to a flight plane of the tilt-prop aircraft, wherein when the tilt angle of the rotor is adjusted, a pitch angle of the blade is varied by a power transmission unit mechanically interlocked with the tilt center shaft.

6 Claims, 11 Drawing Sheets

(56) References Cited

U.S. PATENT DOCUMENTS

| | | | |
|---|---|---|---|
| 2011/0315809 A1* | 12/2011 | Oliver | B64C 29/0033 |
| | | | 244/12.4 |
| 2015/0314865 A1* | 11/2015 | Bermond | B64C 29/0033 |
| | | | 244/17.27 |
| 2016/0031556 A1* | 2/2016 | Bevirt | B64C 29/0008 |
| | | | 244/7 A |
| 2017/0101176 A1* | 4/2017 | Alber | B64C 29/0033 |
| 2017/0158323 A1* | 6/2017 | Ross | B64C 29/0033 |
| 2018/0057159 A1* | 3/2018 | Ivans | B64C 29/0033 |
| 2018/0079503 A1* | 3/2018 | Ivans | B64D 35/08 |

\* cited by examiner

TILT-PROP AIRCRAFT

CROSS-REFERENCE TO RELATED APPLICATION

This application claims the benefit of Korean Patent Application No. 10-2016-0159422, filed on Nov. 28, 2016, in the Korean Intellectual Property Office, the disclosure of which is incorporated herein in its entirety by reference.

BACKGROUND

1. Field

One or more embodiments relate to a tilt-prop aircraft capable of switching between a vertical take-off and landing mode and a forward flight mode.

2. Description of the Related Art

Tilt-prop aircrafts are capable of switching between a vertical take-off and landing (hereinafter, also referred to as "VTOL") mode and a forward flight mode. In general, a tilt-prop aircraft has rotors on left and right ends of a wing, which are configured to rotate in opposite directions. In this case, switching between flight modes is carried out by varying the angles of nacelles including the rotors. That is, if the rotation axes of the rotors are adjusted to be perpendicular to the ground, the rotors may function like rotors of helicopters such that vertical take-off and landing is possible, and if the rotation axes of the rotors are adjusted to be parallel with the ground, the rotors may function like propellers such that high-speed forward flight is possible. In this case, core technology is to convert the rotation axes of the rotors during flight.

When a tilt-prop aircraft operates in a forward flight mode, rotors are oriented in a forward direction, and since the velocity of relative wind entering the rotors increases as the velocity of flight increases, the pitch angles of blades should be largely increased to generate proper thrust. Therefore, additional control actuators may be required to finely adjust the pitch angles of the blades.

However, since electric actuators for adjusting a blade pitch angle and a rotor tilt angle are provided for each rotor, tilt-prop aircrafts of the related art are heavy in addition to having a complicated electric wiring system and consuming a large amount of electricity. In particular, the weight of a multicopter-type tilt-prop aircraft including a plurality of rotors is further increased because two control actuators are provided for each rotor.

SUMMARY

One or more embodiments include a tilt-prop aircraft configured to automatically adjust the pitch angle of a blade using a mechanical power transmission unit when the tilt angle of a rotor is varied, so as to solve problems such as those described above. However, this objective is an example and does not limit the scope of the inventive concept.

Additional aspects will be set forth in part in the description which follows and, in part, will be apparent from the description, or may be learned by practice of the presented embodiments.

According to one or more embodiments, there is provided a tilt-prop aircraft configured to determine operation in a vertical take-off and landing (VTOL) mode or a forward flight mode by adjusting a tilt angle of a rotor connected to a wing, the tilt-prop aircraft including: a blade included in the rotor and configured to rotate to produce lift and thrust; and a tilt center shaft configured to connect the rotor and the wing to each other and adjust the tilt angle of the rotor with respect to a flight plane of the tilt-prop aircraft, wherein when the tilt angle of the rotor is adjusted, a pitch angle of the blade is varied by a power transmission unit mechanically interlocked with the tilt center shaft.

The tilt-prop aircraft may further include a push rod placed on a rotation axis of the rotor and connected to the power transmission unit to vary the pitch angle of the blade when the tilt angle of the rotor is adjusted.

The power transmission unit may include: a rotation link pierced at an end thereof by a fixed hinge shaft fixed in position and parallel to the tilt center shaft, the rotation link configured to be rotatable on the fixed hinge shaft; and a connection link sharing a movable hinge shaft with another end of the rotation link and configured to vary in movement toward the rotation axis of the rotor according to movement of the movable hinge shaft, wherein movement of the push rod for varying the pitch angle of the blade may be varied according to variations in movement of the connection link.

The power transmission unit may further include: a fixed part that is coaxial with the tilt center shaft and fixed in position; a worm gear located on an edge of the fixed part; a worm configured to rotate in engagement with the worm gear; a first gear configured to be rotated by rotation of the worm; a second gear configured to be rotated by a belt connected to the first gear; and a slide screw configured to be linearly moved by rotation of the second gear, wherein movement of the push rod for varying the pitch angle of the blade may be varied according to variations in movement of the slide screw.

The tilt-prop aircraft may include at least three rotors.

The tilt-prop aircraft may further include a duct cylindrically surrounding the rotor.

Other aspects, features, and advantages will become apparent and more readily appreciated from the accompanying drawings, claims, and detailed description.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
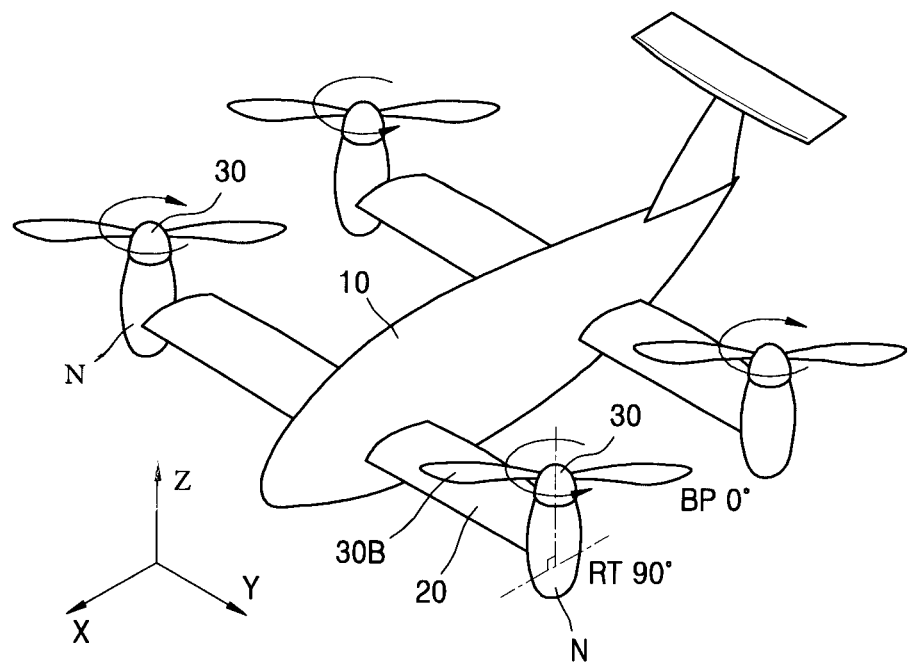
FIG. 1 is a perspective view illustrating a tilt-prop aircraft operating in a vertical take-off and landing mode, according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

The inventive concept may be variously modified, and various embodiments may be provided according to the inventive concept. Hereinafter, some embodiments will be illustrated in the accompanying drawings and described in detail. Effects and features of the inventive concept, and implementation methods thereof will be clarified through the following embodiments described in detail with reference to the accompanying drawings. However, the inventive concept is not limited to the following embodiments but may be implemented in various forms.

Hereinafter, embodiments of the present disclosure will be described in detail with reference to the accompanying drawings. In the following description given with reference to the accompanying drawings, the same elements or corresponding elements are denoted with the same reference numeral, and overlapping descriptions thereof will be omitted.

In the following embodiments, it will be understood that although the terms "first", "second", etc. are used to describe various elements, these elements should not be limited by these terms. These terms are only used to distinguish one element from another.

In the following descriptions of the embodiments, the terms of a singular form may include plural forms unless referred to the contrary.

It will be further understood that the terms "comprises" and/or "comprising" used herein specify the presence of stated features or elements, but do not preclude the presence or addition of one or more other features or elements.

In the following embodiments, when an element is referred to as being connected to another element, the element may be directly connected to the other element, or may be indirectly connected to the other element with intervening elements being therebetween.

In the drawings, the sizes of elements may be exaggerated for clarity. For example, in the drawings, the size or thickness of each element may be arbitrarily shown for illustrative purpose, and thus the inventive concept should not be construed as being limited thereto.

Hereinafter, embodiments of the present disclosure will be described in detail with reference to the accompanying drawings. In the following description given with reference to the accompanying drawings, the same elements or corresponding elements are denoted with the same reference numeral, and overlapping descriptions thereof will be omitted.

Figure 2:
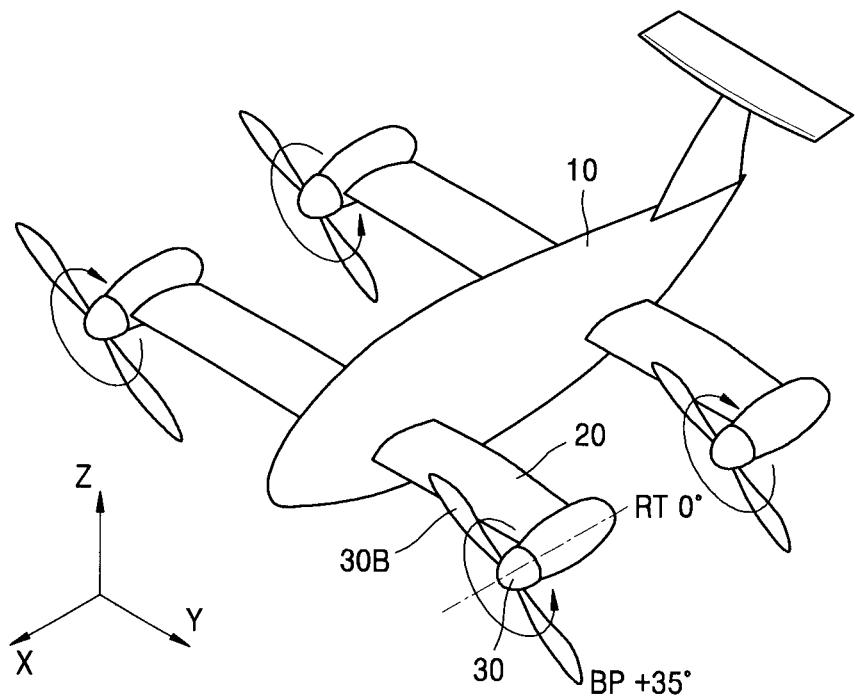
FIG. 2 is a perspective view illustrating the tilt-prop aircraft operating in a forward flight mode, according to an embodiment of the present disclosure.

FIG. 1 is a perspective view illustrating a tilt-prop aircraft operating in a vertical take-off and landing (VTOL) mode according to an embodiment of the present disclosure, and FIG. 2 is a perspective view illustrating the tilt-prop aircraft operating in a forward flight mode according to an embodiment of the present disclosure.

According to the present disclosure, it is determined whether to operate the tilt-prop aircraft in the VTOL mode or the forward flight mode by adjusting the tilt angles RT of rotors 30 connected to wings 20. The tilt-prop aircraft includes: blades 30B included in the rotors 30 and configured to rotate to produce lift and thrust; and tilt center shafts 70 (refer to FIG. 3) connected to the rotors 30 and the wings 20 and configured to adjust the tilt angles RT of the rotors 30 with respect to a flight plane of the tilt-prop aircraft, wherein when the tilt angles RT of the rotors 30 are adjusted, the pitch angles BP of the blades 30B are varied using power transmission units T mechanically interlocked with the tilt center shafts 70.

The tilt-prop aircraft includes a body 10 and the wings 20. The wings 20 have a function of connecting nacelles N including the rotors 30 to the body 10 in addition to having a function of generating lift for the tilt-prop aircraft. When rotated, the blades 30B included in the rotors 30 also generate lift and thrust for the tilt-prop aircraft.

FIGS. 1 and 2 illustrate two flight modes of the tilt-prop aircraft. In FIG. 1, the rotation axes of the rotors 30 are oriented in a direction perpendicular to the ground or the direction in which the body 10 extends. In this case, the angle between the rotation axis of a rotor 30 and the ground is defined as a tilt angle RT of the rotor 30. In FIG. 1, for example, the tilt angles RT of the rotors 30 may be 90°. At this time, since a rotation plane of the rotors 30 is parallel to the ground, the tilt-prop aircraft is in a state capable of VTOL like a helicopter.

In addition, the rotors 30 located on the left and right sides of the body 10 may rotate in opposite directions such that the angular momentums of the rotors 30 may cancel each other out. Then, the tilt-prop aircraft may not include an additional tail rotor.

Unlike this, referring to FIG. 2, the rotation axes of the rotors 30 are oriented in a direction parallel to the ground or the direction in which the body 10 extends. In this case, the tilt angles RT of the rotors 30 may be 0°. In this case, since the rotors 30 function as propellers, the rotors 30 may generate a larger amount of thrust than in the case of FIG. 1, and thus high-speed forward flight may be possible in this state. That is, it may be determined whether to operate the tilt-prop aircraft in the VTOL mode or the forward flight mode by adjusting the tilt angles RT of the rotors 30 with respect to a flight plane of the tilt-prop aircraft.

Figure 3:
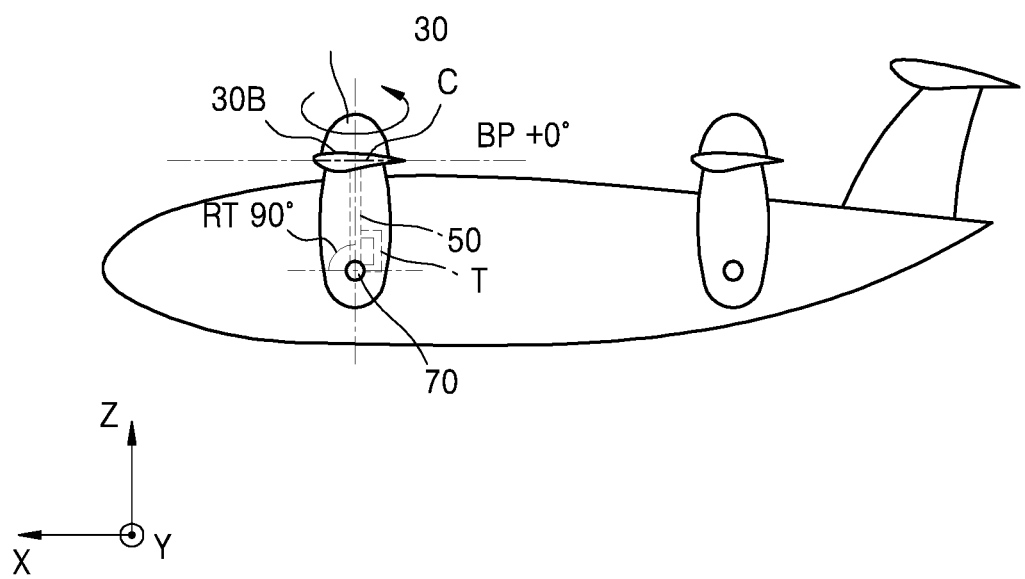
FIG. 3 is a left side view illustrating the tilt-prop aircraft of FIG. 1 in a direction of a Y-axis.
Figure 4:
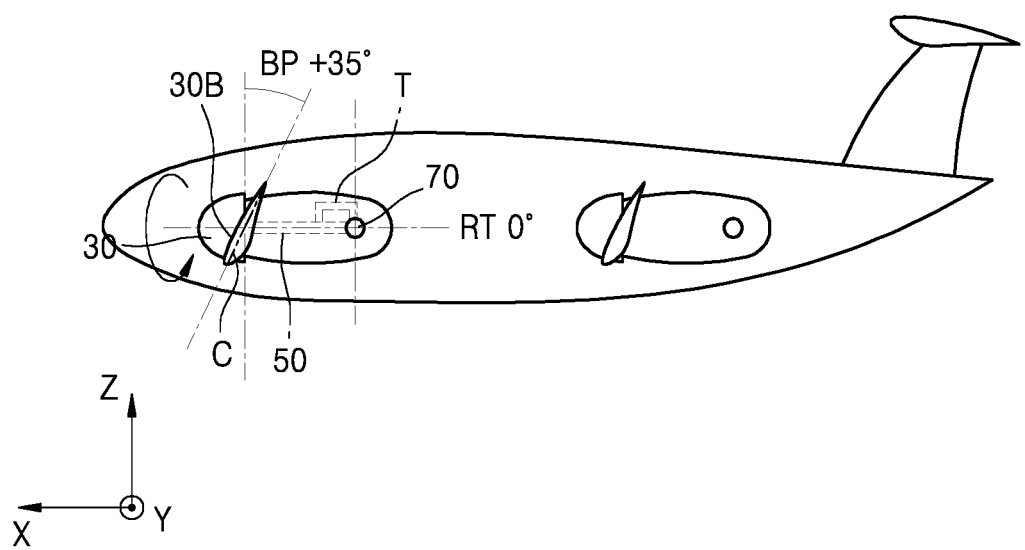
FIG. 4 is a left side view illustrating the tilt-prop aircraft of FIG. 2 in the direction of the Y-axis.

FIG. 3 is a left side view illustrating the tilt-prop aircraft of FIG. 1 in the direction of a Y-axis, and FIG. 4 is a left side view illustrating the tilt-prop aircraft of FIG. 2 in the direction of the Y-axis.

FIG. 3 illustrates the tilt-prop aircraft of FIG. 1, that is, the tilt-prop aircraft operating in the VTOL mode. For ease of description, the blades 30B are illustrated in the form of airfoils. In this case, the degree of inclination of a straight line extending from the chord C of a blade 30B with respect to a rotation plane of a rotor 30 is referred to as a pitch angle BP of the blade 30B, and when the tilt-prop aircraft is in a hovering state, the pitch angles BP of the blades 30B are defined as being 0°. That is, although the pitch angles BP of the blades 30B are not 0° in the VTOL mode and the hovering mode because the chords C are at a certain angle (angle of attack) with respect to the ground, the chords C are drawn as being parallel to a rotation plane of the rotors 30 in FIG. 3 for ease of description. That is, the pitch angles BP of the blades 30B should be understood as values relative to a specific reference state.

FIG. 4 illustrates the tilt-prop aircraft of FIG. 2, that is, the tilt-prop aircraft after switching to the forward flight mode. In the forward flight mode, the rotors 30 are in a forward direction, and since the inflow velocity of relative wind largely increases as the velocity of flight increases, the pitch angles BP of the blades 30B are increased unlike in the VTOL mode so as to produce a proper amount of thrust. That is, when switching from the state of FIG. 3 to the state of FIG. 4, the tilt angles RT of the rotors 30 are varied from 90° to 0° by the rotation of the tilt center shafts 70, and at the same time, the pitch angles BP of the blades 30B are also varied. In this case, the pitch angles of the blades 30B are varied by 35° in the example shown in FIGS. 2 and 4. However, the inventive concept is not limited thereto.

In this case, according to the present disclosure, when the tilt angles RT of the rotors 30 are adjusted, the pitch angles BP of the blades 30B are also varied by the power transmission units T mechanically interlocked with the tilt center shafts 70. That is, the tilt angles RT of the rotors 30 are varied to determine the flight mode of the tilt-prop aircraft, and at the same time, the pitch angles BP of the blades 30B are properly varied according to the flight mode. In this case, the pitch angles BP of the blades 30B are varied simultaneously and automatically according to variations in the tilt angles RT of the rotors 30, and blade pitch angle control actuators that is electrically operated may not be additionally included in the tilt-prop aircraft. That is, since the mechanical power transmission units T are used instead of blade pitch angle control actuators required for tilt-prop aircrafts of the related art, the amount of electricity consumption and the weight of the tilt-prop aircraft may be reduced, thereby simplifying the system of the tilt-prop aircraft and improving reliability.

According to an embodiment, the tilt-prop aircraft further includes push rods 50 arranged on the rotation center axes of the rotors 30 and connected to the power transmission units T for varying the pitch angles BP of the blades 30B when the tilt angles RT of the rotors 30 are adjusted.

The push rods 50 may be placed on the rotation center axes of the rotors 30. According to movements of the tilt center shafts 70 for adjusting the tilt angles RT of the rotors 30, the push rods 50 are vertically moved along the rotation center axes by the power transmission units T mechanically interlocked with the tilt center shafts 70. The blades 30B are connected to the push rods 50 such that the pitch angles BP of the blades 30B may be varied according to the movements of the push rods 50. The pitch angles BP of the blades 30B may be varied according to vertical movements of the push rods 50 by any well-known method.

Hereinafter, an embodiment of the power transmission units T for varying the pitch angles BP of the blades 30B through tilting of the rotors 30 will be described. The embodiment is for illustrative purposes only and does not limit the scope of the inventive concept.

Figure 5:
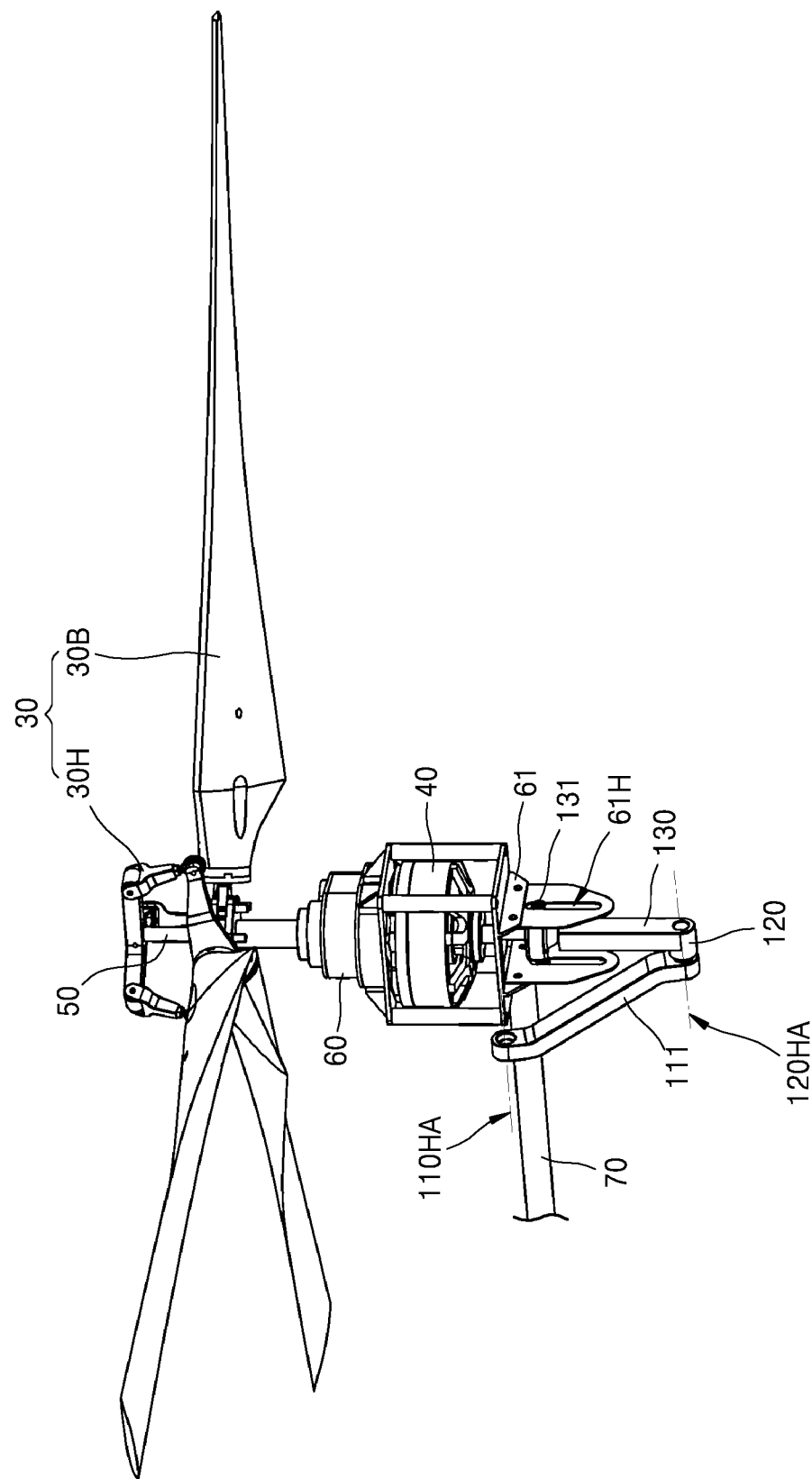
FIG. 5 is a detailed perspective view illustrating a rotor and a power transmission unit that are of a link type.
Figure 6:
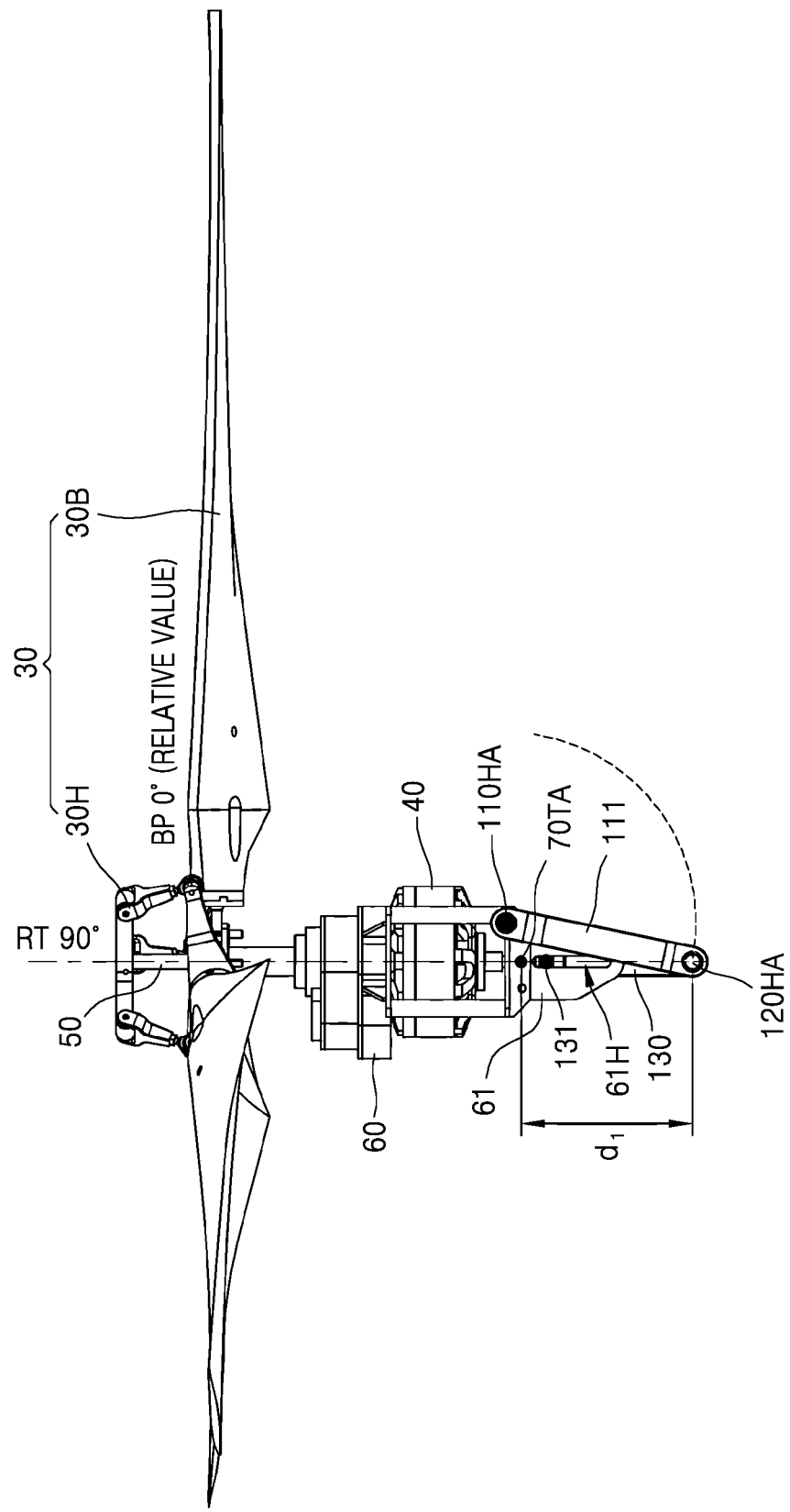
FIG. 6 is a side view illustrating the rotor and the power transmission unit of FIG. 5 in a vertical take-off and landing mode.
Figure 7:
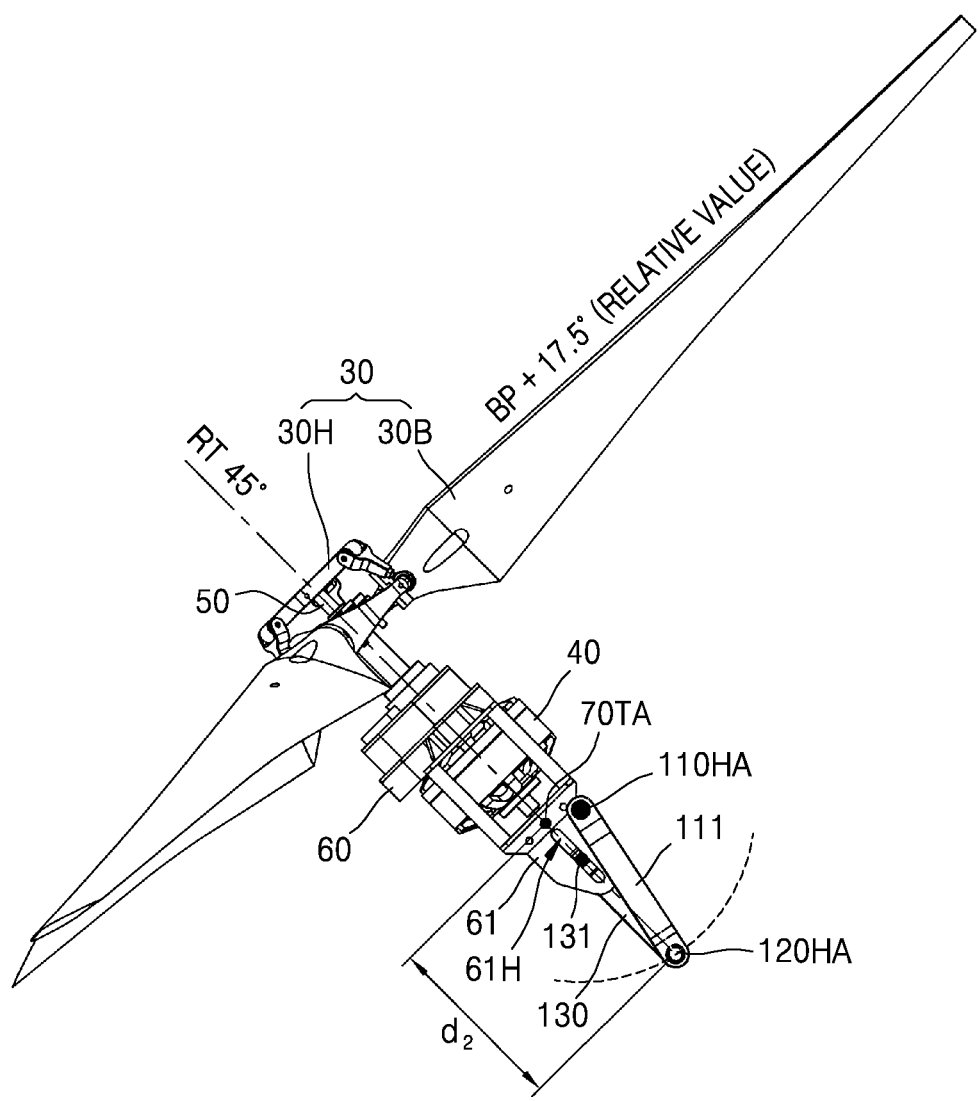
FIG. 7 is a side view illustrating switching from the vertical take-off and landing mode to a forward flight mode.
Figure 8:
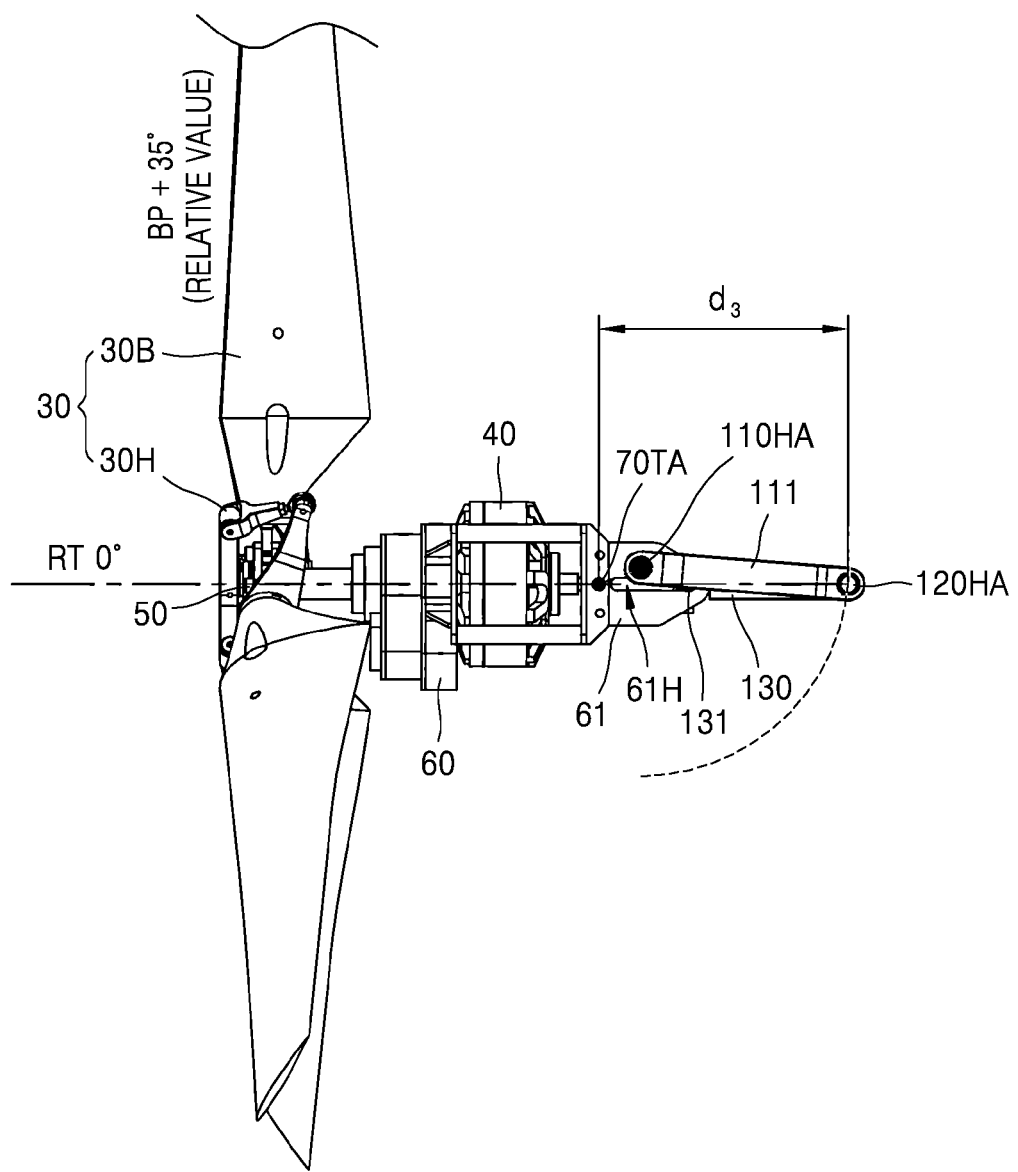
FIG. 8 is a side view in the forward flight mode.

FIG. 5 is a detailed perspective view illustrating a rotor 30 and a power transmission unit T that are of a link type; FIG. 6 is a side view illustrating the rotor 30 and the power transmission unit T of FIG. 5 in a vertical take-off and landing mode; FIG. 7 is a side view illustrating switching from the vertical take-off and landing mode to a forward flight mode; and FIG. 8 is a side view in the forward flight mode.

According to an embodiment, the power transmission unit T includes: a rotation link 111 pierced at an end thereof by a fixed hinge shaft 110HA fixed in position and parallel to a tilt center shaft 70 (70TA) so as to be rotated on the fixed hinge shaft 110HA; and a connection link 130 sharing a movable hinge shaft 120HA with the other end of the rotation link 111 and configured to vary in movement toward the rotation axis of the rotor 30 according to movement of the movable hinge shaft 120HA, wherein movement of a push rod 50 for varying the pitch angles BP of blades 30B is varied according to variations in the movement of the connection link 130.

Referring to FIG. 5, the fixed hinge shaft 110HA parallel with the tilt center shaft 70 penetrates an end of the rotation link 111. Thus, the rotation link 111 may be rotated on the fixed hinge shaft 110HA. Although not shown in FIG. 5, a physical element connected to the body 10 or a wing 20 is provided for the fixed hinge shaft 110HA.

The connection link 130 is placed on the other end of the rotation link 111 to share the movable hinge shaft 120HA with the connection link 130. That is, the other end of the rotation link 111 and an end of the connection link 130 may be hinged to each other, for example, by a link connection part 120 and may thus be moved together. That is, the rotation link 111 and the connection link 130 may be moved relative to each other about the link connection part 120.

If the position of the movable hinge shaft 120HA is varied about the fixed hinge shaft 110HA, movement of the connection link 130 toward the rotation axis of the rotor 30 is accordingly varied. This will be described later.

In addition, the push rod 50 for adjusting the pitch angles BP of the blades 30B is located on the rotation axis of the rotor 30. The push rod 50 is inserted through a transmission 40 and a housing 60 surrounding the transmission 40. The connection link 130 connected to the push rod 50 is located below the push rod 50. The connection link 130 converts a tilt of the rotor 30 into a linear motion such that the push rod 50 may be vertically moved along the rotation axis of the rotor 30.

For example, housing lower parts 61 having sliding slots 61H are located on lower left and right sides of the housing 60, and a slider 131 connected to the connection link 130 is placed between the sliding slots 61H. The slider 131 is configured to reciprocate linearly between the sliding slots 61H to adjust vertical movements of the push rod 50 and the connection link 130.

Referring to FIG. 6, the rotation link 111 may be rotated about the fixed hinge shaft 110HA, and at this time, the movable hinge shaft 120HA and a lower portion of the rotation link 111 connected to the movable hinge shaft 120HA may be moved in a circle. The fixed hinge shaft 110HA is located at a position slightly off the center axis of the rotor 30, and the tilt center shaft 70TA is located at the center of the rotor 30. Accordingly, when the tilt angle RT of the rotor 30 is 90°, the rotation link 111 is maintained in a diagonally slanted state.

Referring to FIG. 7, the rotation link 111 is rotated about the fixed hinge shaft 110HA, and thus the tilt angle RT of the rotor 30 is 45°. At this time, since the rotation link 111 is rotated in a direction away from the tilt center shaft 70TA in a state in which the positions of the fixed hinge shaft 110HA and the tilt center shaft 70TA and the length of the rotation link 111 are fixed, a distance $d_2$ between the tilt center shaft 70TA and the movable hinge shaft 120HA is greater than a distance $d_1$ shown in FIG. 6. That is, the position of the slider 131 moving in the sliding slots 61H and the position of the connection link 130 are lowered (to a right lower side in FIG. 7) from original positions thereof, and thus the push rod 50 connected to the connection link 130 is moved downward. The push rod 50 is connected to a hub 30H, and the pitch angles BP of the blades 30B are adjusted by the hub 30H. Although FIG. 7 illustrates an example in which the pitch angles BP of the blades 30B are 17.5°, the inventive concept is not limited thereto.

Referring to FIG. 8, the rotation link 111 is further rotated about the fixed hinge shaft 110HA, and thus tilt angle RT of the rotor 30 is 0°. At this time, since the rotation link 111 is rotated in a direction away from the tilt center shaft 70TA in a state in which the positions of the fixed hinge shaft 110HA and the tilt center shaft 70TA and the length of the rotation link 111 are fixed, a distance $d_3$ between the tilt center shaft 70TA and the movable hinge shaft 120HA is greater than the distance $d_2$ shown in FIG. 7. That is, the position of the slider 131 moving in the sliding slots 61H and the position of the connection link 130 are lowered (to a right side in FIG. 8) from original positions thereof, and thus the push rod 50 connected to the connection link 130 is moved downward. The push rod 50 is connected to the hub 30H, and the pitch angles BP of the blades 30B are adjusted by the hub 30H. Although FIG. 8 illustrates an example in which the pitch angles BP of the blades 30B are 35°, the inventive concept is not limited thereto.

That is, the push rod 50 connected to the power transmission unit T including the fixed hinge shaft 110HA, the tilt center shaft 70TA, the movable hinge shaft 120HA, the rotation link 111, and the connection link 130 is linearly moved for adjusting the tilt angle RT of the rotor 30. Therefore, the blades 30B connected to the push rod 50 are adjusted by, for example, the hub 30H, and thus the pitch angles BP of the blades 30B are varied.

Hereinafter, another embodiment of the power transmission units T for varying the pitch angles BP of the blades 30B through tilting of the rotors 30 will be described. This embodiment is for illustrative purposes only and does not limit the scope of the inventive concept.

Figure 9:
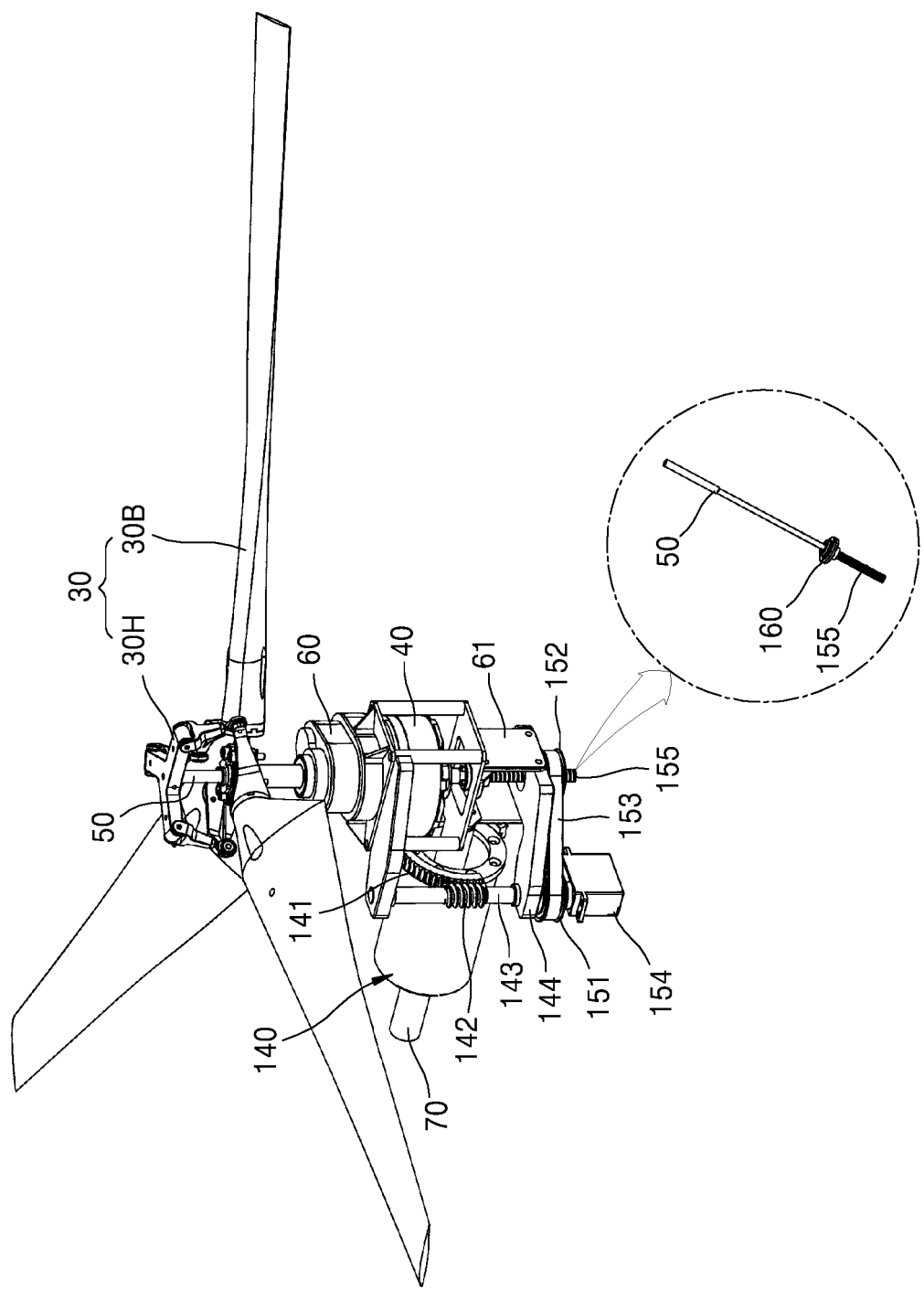
FIG. 9 is a detailed perspective view illustrating a rotor and a power transmission unit that are of a belt type.
Figure 10:
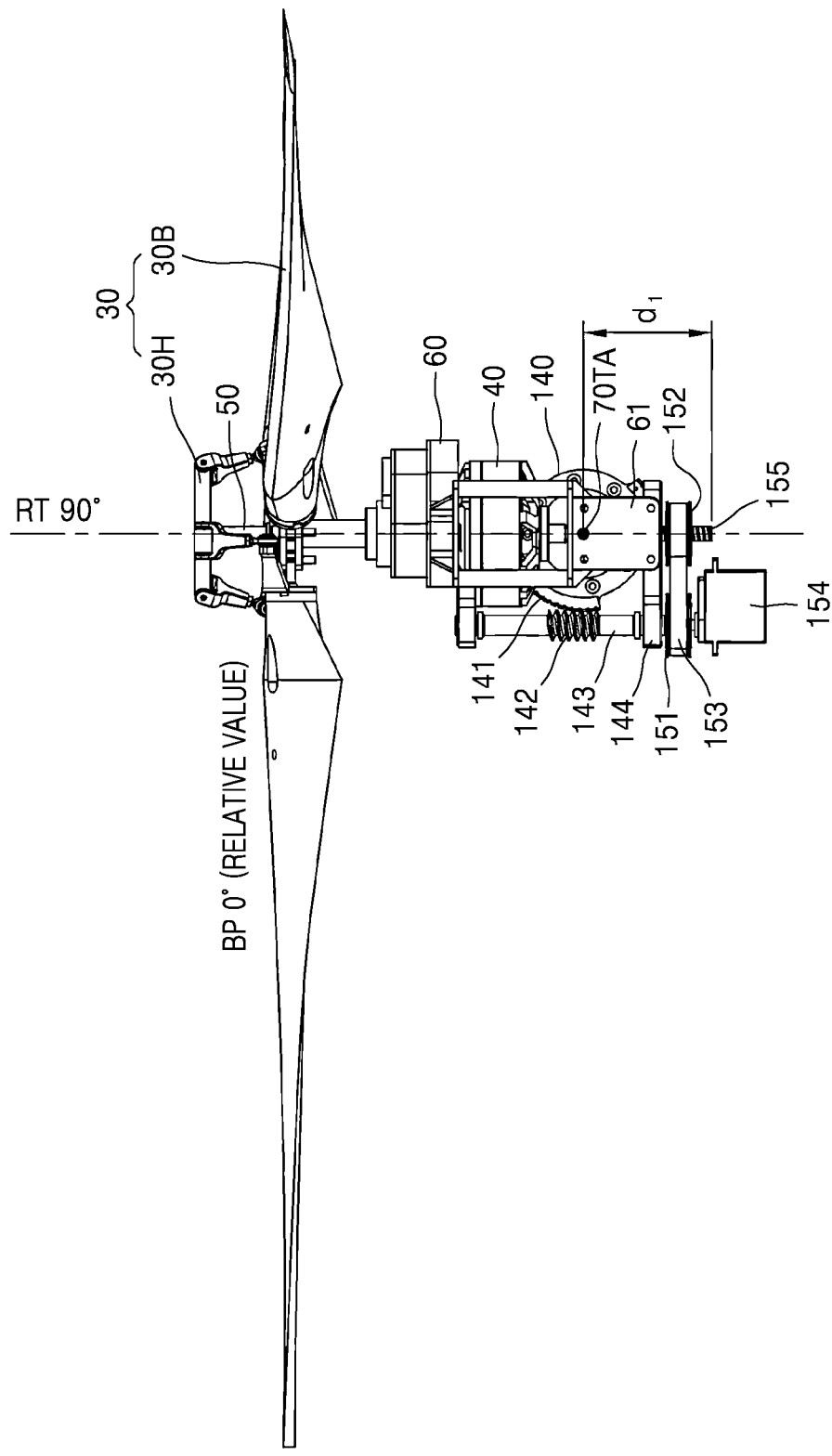
FIG. 10 is a side view illustrating the rotor and the power transmission unit of FIG. 9 in a vertical take-off and landing mode.
Figure 11:
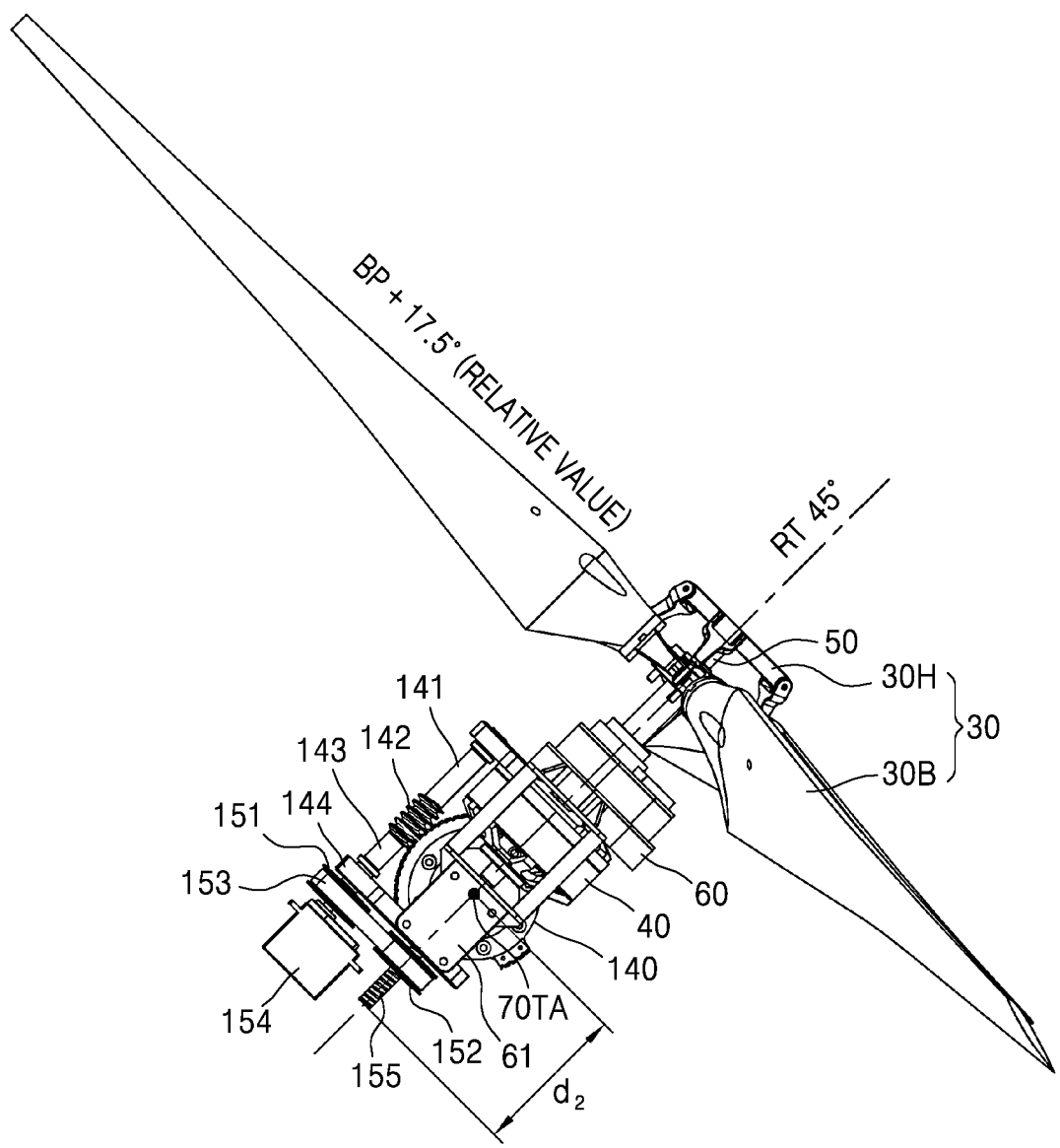
FIG. 11 is a side view illustrating switching from the vertical take-off and landing mode to a forward flight mode.
Figure 12:
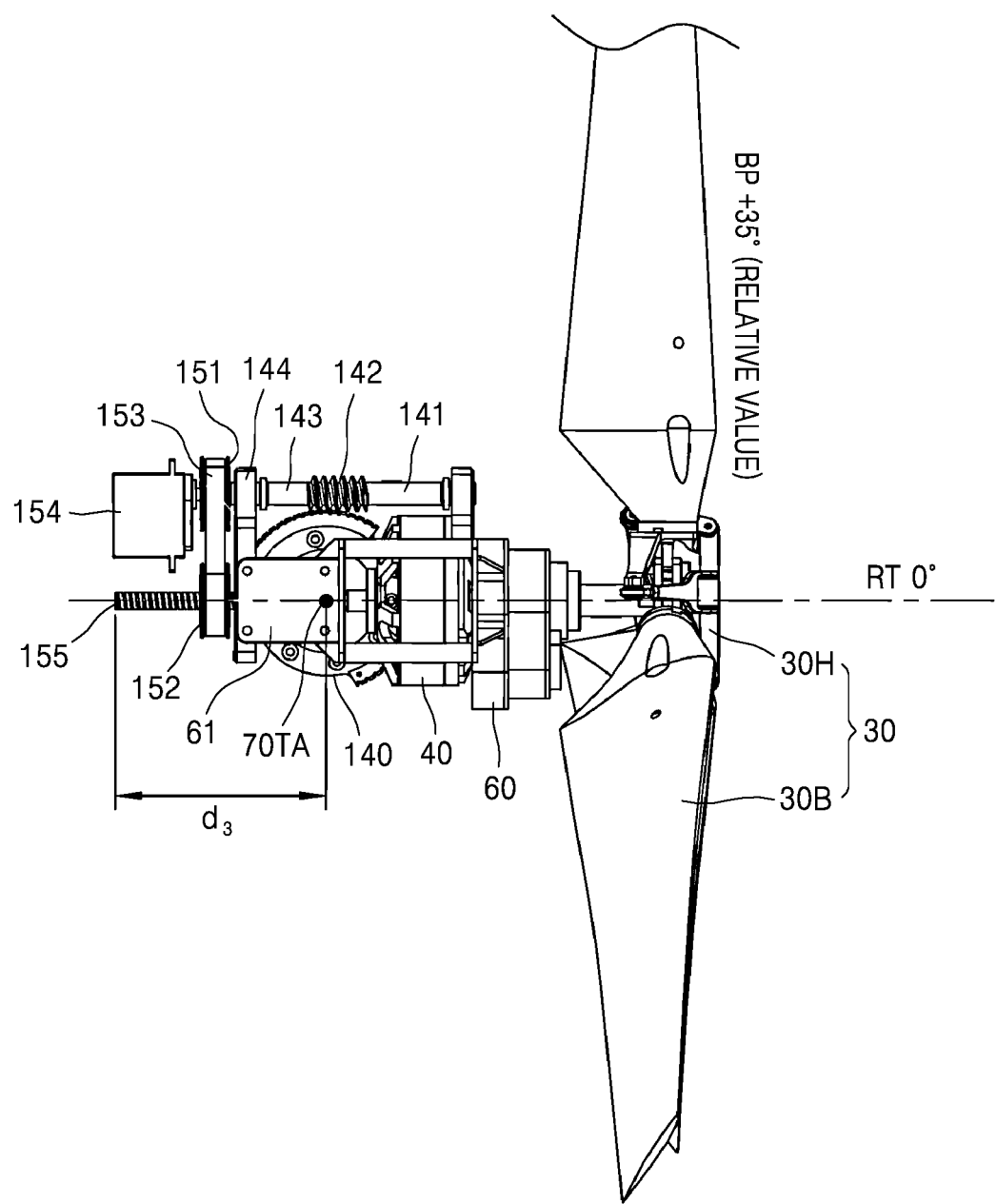
FIG. 12 is a side view in the forward flight mode.

FIG. 9 is a detailed perspective view illustrating a rotor 30 and a power transmission unit T that are of a belt type; FIG. 10 is a side view illustrating the rotor 30 and the power transmission unit T of FIG. 9 in a vertical take-off and landing mode; FIG. 11 is a side view illustrating switching from the vertical take-off and landing mode to a forward flight mode; and FIG. 12 is a side view in the forward flight mode.

According to an embodiment, the power transmission unit T includes: a fixed part 140 coaxial with a tilt center shaft 70 and fixed in position; a worm gear 141 placed on an edge of the tilt center shaft 70; a worm 142 configured to rotate in engagement with the worm gear 141; a first gear 151 configured to be rotated by rotation of the worm 142; a second gear 152 configured to be rotated by a belt 153 connected to the first gear 151; and a slide screw 155 configured to be linearly moved by rotation of the second gear 152, wherein movement of a push rod 50 for varying the pitch angles BP of blades 30B is varied according to variations in the movement of the slide screw 155.

Referring to FIGS. 9 and 10, the rotor 30 is connected to the tilt center shaft 70 (70TA). As the tilt center shaft 70 is rotated, the tilt angle RT of the rotor 30 is adjusted. At this time, the push rod 50 for adjusting the pitch angles BP of the blades 30B is located on the rotation axis of the rotor 30. The push rod 50 is inserted through a transmission 40 and a housing 60 surrounding the transmission 40. The slide screw 155 connected to the push rod 50 via a bearing block 160 is located below the push rod 50. The slide screw 155 converts a rotation motion by a tilt of the rotor 30 into a linear motion such that the push rod 50 may be vertically moved along the rotation axis of the rotor 30. Hereinafter, a detailed driving principle thereof will be described.

The fixed part 140 coaxial with the tilt center shaft 70 is placed outside the tilt center shaft 70. The fixed part 140 is fixed to the body 10 or a wing 20. That is, even when the tilt center shaft 70 rotates, the fixed part 140 is fixed in position relative to the wing 20.

A worm gear 141 is located on one side of the fixed part 140. The worm gear 141 is connected to the worm 142 supported by a worm shaft 143. In this case, the worm shaft 143 is at an angle of 90° with respect to the tilt center shaft 70. The worm shaft 143 is inserted through a worm shaft fixing part 144 connected to housing lower parts 61 and is then connected to a first gear 151. The first gear 151 is connected to a second gear 152 by a belt 153.

According to an embodiment, a worm gear operating servomotor 154 may be placed below the first gear 151. The worm gear operating servomotor 154 rotates the worm shaft 143 to rotate the worm 142 along the worm gear 141. Accordingly, the rotor 30 indirectly connected to the worm 142 also rotates. Thus, the tilt angle RT of the rotor 30 is adjusted.

The first gear 151 is also rotated by the worm gear operating servomotor 154, so that the second gear 152 connected by the belt 153 also rotates. A slide screw 155 connected to the second gear 152 converts rotation into linear motion. Accordingly, the slide screw 155 is tightened or loosened, and thus the push rod connected to a bearing block 160 is vertically moved along the rotation axis of the rotor 30. The push rod 50 moved along the rotation axis of the rotor 30 can adjust the pitch angles BP of the blades 30B. That is, the worm gear operating servomotor 154 can adjust the tilt angle RT of the rotor, and as a result, and the pitch angles BP of the blades 30B can be automatically adjusted. The ratio of adjustment of the pitch angles BP of the blades 30B to adjustment of the tilt angle RT of the rotor 30 may be controlled using the gear ratio of the first gear 151 and the second gear 152.

Referring to FIG. 11, the tilt angle RT of the rotor 30 is varied to 45° by rotation of the tilt center shaft 70. At this time, since the slide screw 155 is rotated and vertically moved by the rotation of the belt 153 and the second gear 152, a distance $d_2$ between the tilt center shaft 70 and the slide screw 155 is different from a distance $d_1$ shown in FIG. 10. If the slide screw 155 is loosened, $d_2$ is greater than $d_1$. Accordingly, the push rod 50 connected to the slide screw 155 is moved downward (to a left lower side in FIG. 11). Then, the pitch angles BP of the blades 30B are varied by a hub 30H connected to the push rod 50. Although FIG. 11 illustrates an example in which the pitch angles BP of the blades 30B are 17.5°, the inventive concept is not limited thereto.

Referring to FIG. 12, the tilt angle RT of the rotor 30 is varied to 0° by rotation of the tilt center shaft 70. At this time, since the slide screw 155 is rotated and vertically moved by rotation of the belt 153 and the second gear 152, a distance $d_3$ between the tilt center shaft 70 and the slide screw 155 is different from the distance $d_2$ shown in FIG. 11. If the slide screw 155 is loosened, $d_3$ is greater than $d_2$. Accordingly, the push rod 50 connected to the slide screw 155 is moved downward (to a left side in FIG. 12). Then, the pitch angles BP of the blades 30B are varied by the hub 30H connected to the push rod 50. Although FIG. 12 illustrates an example in which the pitch angles BP of the blades 30B are 35°, the inventive concept is not limited thereto.

That is, the push rod 50 connected to the power transmission unit T including the fixed part 140, the worm gear 141, the worm shaft 143, the first gear 151, the second gear 152, the belt 153, and the slide screw 155 is linearly moved for adjusting the tilt angle RT of the rotor 30. Therefore, the blades 30B connected to the push rod 50 are adjusted by, for example, the hub 30H, and thus the pitch angles BP of the blades 30B are varied.

According to the present disclosure, the pitch angles BP of the blades 30B may have a fixed value in the VTOL mode and the forward flight mode, respectively. Therefore, in the forward flight mode, the thrust can be controlled by changing the RPMs of the rotor 30. Also, the wings 20 may be provided with control surfaces such as a flaperon for controlling the attitude of the aircraft in the forward flight mode.

Figure 13:
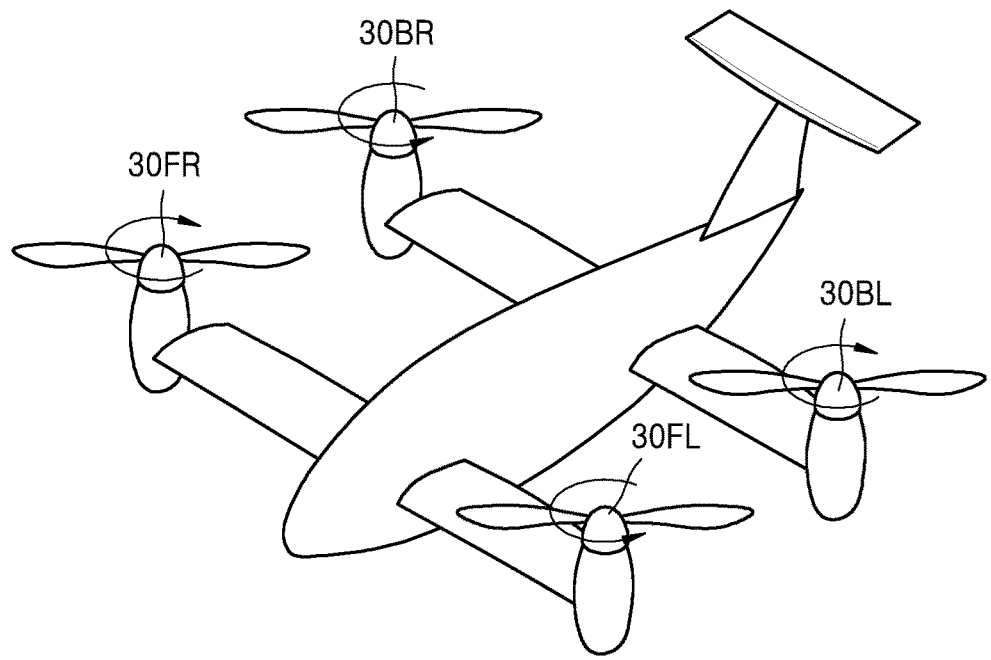
FIG. 13 is a perspective view schematically illustrating a multicopter-type tilt-prop aircraft.

FIG. 13 is a perspective view schematically illustrating a multicopter-type tilt-prop aircraft.

According to an embodiment, the tilt-prop aircraft may include at least three rotors 30. Referring to FIG. 13, for example, the tilt-prop aircraft may be a quadcopter-type tilt-prop aircraft having four rotors 30.

Although the quadcopter-type tilt-prop aircraft does not include an additional device for adjusting the blade pitch of each rotor, vertical take-off and landing (VTOL), pitching, rolling, and yawing of the quadcopter-type tilt-prop aircraft may be also controlled in VTOL mode configuration by changing the RPMs of the rotor 30. First, take-off and landing of the quadcopter-type tilt-prop aircraft may be controlled by increasing or decreasing the RPMs of the four rotors 30 (30FL, 30FR, 30BL, and 30BR).

The RPMs of front rotors 30FL and 30FR or back rotors 30BL and 30BR of the tilt-prop aircraft may be adjusted to be different from those of the other rotors so as to control pitching of the tilt-prop aircraft. For example, if the RPMs of the back rotors 30BL and 30BR are relatively increased, forward flight is possible, and if the RPMs of the front rotors 30FL and 30FR are relatively increased, backward flight is possible.

The RPMs of left rotors 30FL and 30BL or right rotors 30FR and BR of the tilt-prop aircraft may be adjusted to be different from those of the other rotors so as to control rolling of the tilt-prop aircraft. For example, if the RPMs of the left rotors 30FL and 30BL are relatively increased, the tilt-prop aircraft may roll to the right, and if the RPMs of the right rotors 30FR and 30BR are relatively increased, the tilt-prop aircraft may roll to the left.

The RPMs of diagonal rotors of the tilt-prop aircraft may be adjusted to be different from those of the other rotors so as to control yawing of the tilt-prop aircraft. For example, if the RPMs the front left rotor 30FL and the back right rotor 30BR are relatively increased, the tilt-prop aircraft may rotate to the right, and if the RPMs of the front right rotor 30FR and the back left rotor 30BL are relatively increased, the tilt-prop aircraft may rotate to the left.

The rotation direction of each rotor 30, and the control methods for pitching, rolling, and yawing described with reference to FIG. 13 are for illustrative purposes only, and the inventive concept is not limited thereto.

The stability of a multicopter including at least three rotors may be improved if the multicopter has a plurality of wings. In the case of multicopter-type multi-tilt-prop aircrafts of the related art, however, each rotor includes an additional electric blade pitch angle control actuator.

However, according to the present disclosure, since the mechanical power transmission unit T is used instead of a blade pitch angle required for a tilt-prop aircraft of the related art, it is possible to decrease the amount of electricity consumption and the weight of an aircraft and improve reliability owing to a simple system. In particular, since each rotor 30 does not have a control actuator, the electricity consumption and the weight of an aircraft may be further reduced for a multi-tilt-prop aircraft (for example, 6-tilt-prop aircraft or 8-tilt-prop aircraft).

Figure 14:
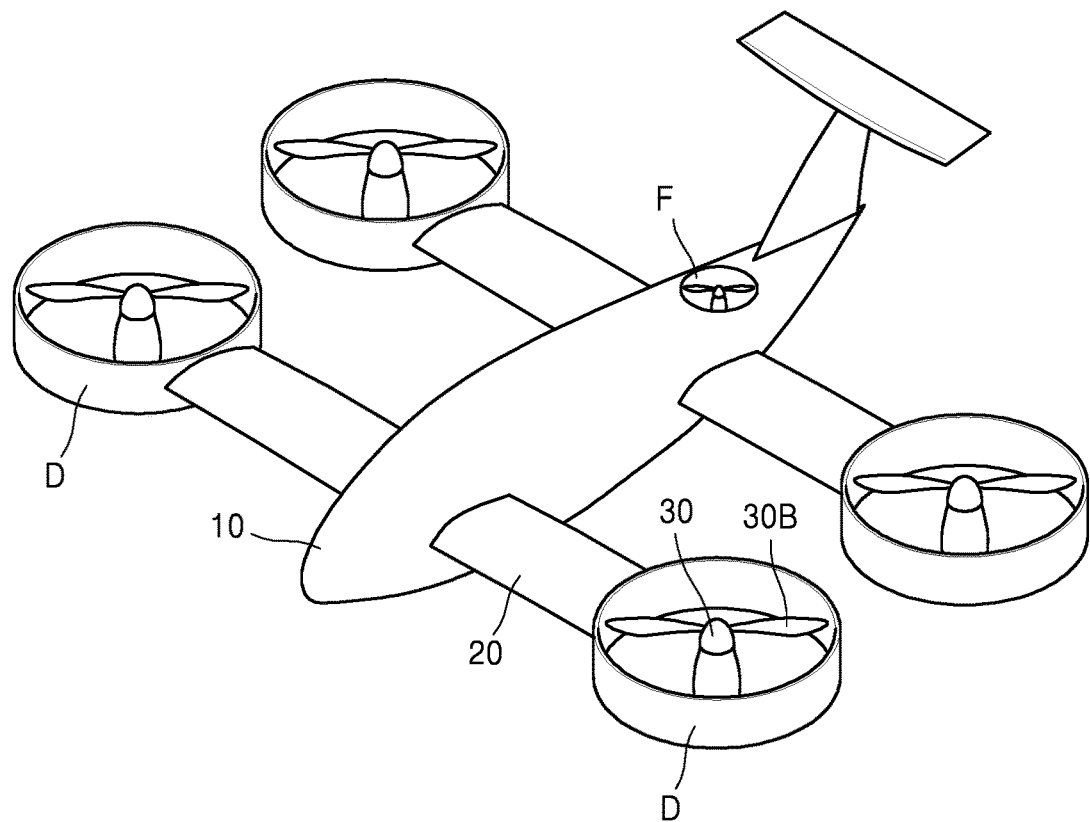
FIG. 14 is a perspective view schematically illustrating a tilt-duct-type tilt-prop aircraft.

FIG. 14 is a perspective view schematically illustrating a tilt-duct-type tilt-prop aircraft.

According to an embodiment, the tilt-duct-type tilt-prop aircraft may include ducts D cylindrically surrounding rotors 30. Referring to FIG. 14, the ducts D are placed around the rotors 30 to cylindrically surround the rotors 30. The rotors 30 and blades 30B are rotated inside the ducts D. The ducts D are configured to tilt together with the rotors 30. Owing to the ducts D, the aerodynamic characteristics of the tilt-duct-type tilt-prop aircraft, that is, thrust and drag efficiency are improved. In addition, the tilt-duct-type tilt-prop aircraft may include a rear fan F on a rear portion of a body 10. The fan F may improve the stability and maneuverability of the tilt-prop aircraft.

According to the present disclosure, when the tilt angle of the rotor is adjusted, the pitch angle of the blade is also automatically varied by the power transmission unit mechanically interlocked with the tilt center shaft. That is, the tilt angle of the rotor is varied to determine the flight mode of the tilt-prop aircraft, and at the same time, the pitch angle of the blade is properly varied according to the flight mode. In this case, the pitch angle of the blade is varied simultaneously and automatically according to variations in the tilt angle of the rotor, and a blade pitch angle control actuator that is electrically operated may not be additionally included in the tilt-prop aircraft. That is, since the mechanical power transmission unit is used instead of a blade pitch angle that is required for tilt-prop aircrafts of the related art, the amount of electricity consumption and the weight of the tilt-prop aircraft may be reduced, thereby simplifying the system of the tilt-prop aircraft and improving reliability. However, the inventive concept is not limited thereto.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A tilt-prop aircraft configured to operate in a vertical take-off and landing (VTOL) mode or a forward flight mode by adjusting a tilt angle of a rotor connected to a wing, the tilt-prop aircraft comprising:
   a blade included in the rotor and configured to rotate to produce lift and thrust;
   a tilt center shaft configured to connect the rotor and the wing to each other and adjust the tilt angle of the rotor with respect to a flight plane of the tilt-prop aircraft; and
   a push rod placed on a rotation axis of the rotor and connected to the power transmission unit to vary the pitch angle of the blade when the title angle of the rotor is adjusted, wherein when the tilt angle of the rotor is adjusted, a pitch angle of the blade is varied by a power transmission unit mechanically interlocked with the tilt center shaft, and wherein the power transmission unit comprises:

a rotation link pierced at an end thereof by a fixed hinge shaft fixed in position and parallel to the tilt center shaft, the rotation link configured to be rotatable on the fixed hinge shaft; and a connection link sharing a movable hinge shaft with another end of the rotation link and configured to vary in movement toward the rotation axis of the rotor according to movement of the movable hinge shaft, wherein movement of the push rod for varying the pitch angle of the blade is varied according to variations in movement of the connection link.

2. The tilt-prop aircraft of claim 1, wherein the tilt-prop aircraft comprises at least three rotors.

3. The tilt-prop aircraft of claim 1, further comprising a duct cylindrically surrounding the rotor.

4. A tilt-prop aircraft configured to operate in a vertical take-off and landing (VTOL) mode or a forward flight mode by adjusting a tilt angle of a rotor connected to a wing, the tilt-prop aircraft comprising:

a blade included in the rotor and configured to rotate to produce lift and thrust;

a tilt center shaft configured to connect the rotor and the wing to each other and adjust the tilt angle of the rotor with respect to a flight plane of the tilt-prop aircraft; and a push rod placed on a rotation axis of the rotor and connected to the power transmission unit to vary the pitch angle of the blade when the tilt angle of the rotor is adjusted, wherein the power transmission unit further comprises:

a fixed part that is coaxial with the tilt center shaft and fixed in position;

a worm gear located on an edge of the fixed part;

a worm configured to rotate in engagement with the worm gear;

a first gear configured to be rotated by rotation of the worm;

a second gear configured to be rotated by a belt connected to the first gear; and a slide screw configured to be linearly moved by rotation of the second gear, wherein movement of the push rod for varying the pitch angle of the blade is varied according to variations in movement of the slide screw.

5. The tilt-prop aircraft of claim 4, wherein the tilt-prop aircraft comprises at least three rotors.

6. The tilt-prop aircraft of claim 4, further comprising a duct cylindrically surrounding the rotor.

* * * * *